United States Patent
Cromer et al.

(10) Patent No.: US 6,189,108 B1
(45) Date of Patent: *Feb. 13, 2001

(54) REPORTING OF POWER STATES FOR A NETWORK CONNECTED PC

(75) Inventors: Daryl Carvis Cromer; Howard Locker, both of Cary; Randall Scott Springfield, Chapel Hill; James Peter Ward, Raleigh, all of NC (US)

(73) Assignee: International Business Machine Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/025,975

(22) Filed: Feb. 19, 1998

(51) Int. Cl.$^7$ .................................................. G06F 1/26
(52) U.S. Cl. .................. 713/340; 713/300; 709/224; 709/203
(58) Field of Search .................. 713/340, 300, 713/310, 320, 323; 709/203, 224; 365/226, 228, 229

(56) References Cited

U.S. PATENT DOCUMENTS

| | | | | |
|---|---|---|---|---|
| 4,750,175 | * | 6/1988 | Brenneman et al. | 371/22 |
| 5,404,544 | * | 4/1995 | Crayford | 713/340 |
| 5,594,426 | * | 1/1997 | Ushijima et al. | 340/825.02 |
| 5,630,049 | * | 5/1997 | Cardoza et al. | 714/25 |

* cited by examiner

Primary Examiner—Ario Etienne
(74) Attorney, Agent, or Firm—George E. Grosser; Andrew Dillon

(57) ABSTRACT

A client on a network is provided with low power logic, at the network adaptor, that is always active and simulates network packet traffic (e.g. Ethernet packets) normally sent under control of the main client system processor(s). This logic collects client status information regarding power state and reports to the network manager such information which allows the network manager to exercise broader control and perform maintenance and upgrades which would usually require a dialog with the user and consequently limit off-hours reconfiguring of the client.

8 Claims, 11 Drawing Sheets

REPORTING OF POWER STATES FOR A NETWORK CONNECTED PC

BACKGROUND OF THE INVENTION

Field of the Invention

The invention relates generally to the field of network-connected personal computers and, in particular, to transfers of status and control information for such computers over the network.

BACKGROUND

With personal computers (PCs) being increasingly connected into networks to allow transfers of data among computers to occur, more operations such as maintenance and updating of applications and data collections are occurring over the network. As computers are also becoming essential to their users to perform their work it is desirable to shift the time when maintenance and updates occur to not interfere with productive work. Shifting the time for such activity is not an easy matter because the computers on the network (clients) are usually shut down at off hours and thus are unavailable to interact for maintenance and updating.

One solution to this problem has been wake up technology, such as IBM's Wake on LAN technology which supports special signaling over a network to cause a client to power itself up. The network manager may then perform various operations on the client.

A probem with this is that the client may not be turned off but may be powered up but locked in a loop or have other trouble that could be corrected by the network manager by for example reloading the operating system or a particular application program. This is just the type of activity that would desirably be handled off hours but, unfortunately no one is there available to report on machine status.

SUMMARY OF THE INVENTION

While remote wakeup of client systems has made the network manager's support of client systems more convenient, it is limited in that there are six possible power states (for the generally followed Advanced Configuration and Power Interface or ACPI standard) that a system may be in at a given time. The network manager must generally force the system to power down (to move to a known from an unknown state) and then bring it up again to be sure of the current state. This takes time and may be ineffective if the system has a maintenance problem—one of the situations where it would be desirable to take action without user intervention.

Related patent application Ser. No. 09/024,231 filed Feb. 17, 1998 filed and entitled "Full Time Network Auxiliary for a Network Conected PC" describes logic for sending a signal indicating status information of the corresponding client computer to a network manager over the network. According to the present invention an auxiliary processor that communicates with the network adapter and is always on as a result of trickle power thereto analyzes selected events in the operation of the client system and deduces the power state from these events. Hence while there is normally no set of flags set to indicate power state, the auxiliary processor looks for events selected according to the invention to provide adequate basis for deducing the current state.

Through a connection to the network through a portion of the network adapter, which is also trickle powered to always be on, the auxiliary processor sends occasional signals in network format, preferably a periodic "heartbeat" signal, to the system manager indicating the current power state. This allows the network manager to perform operations without time consuming state transfers to get to a known state. Also, such state transfer operations that could create further problems for a wounded system or can't be forced, under the existing circumstances, may be avoided to permit more maintenance options.

Information of particular interest to the network manager is the power state of the client. There are four states defined for a PC conforming to the ACPI specification. These states, while being exclusive, are not detectable at a point in time. The present invention recognizes that the by monitoring certain events involving the operating system and the power to the system it is possible to deduce the current power state. Then according to a presently preferred implementation for the invention the current power information is broadcast over the network periodically to be available to the network master. With such information the network master has greater flexibility in performing maintenance and update operations on the client.

Preferably, the packets are sent out on a periodic basis (a heartbeat signal) to keep the network manager aware of the power status information. According to a preferred implementation, the signals are introduced to the client side of the "physical layer" of the network controller. That is the layer that conditions the packet signal to analog form to go out over the physical connecting network that is the LAN. By so configuring the packet to have the characteristics of a standard packet, it passes over the client's normal network connection and through the network as if a normal packet created by the client.

BRIEF DESCRIPTION OF THE DRAWINGS

A presently preferred implementation for the invention will now be described in detail with reference to the drawings wherein.

DESCRIPTION OF THE PREFERRED EMBODIMENT

Figure 1:
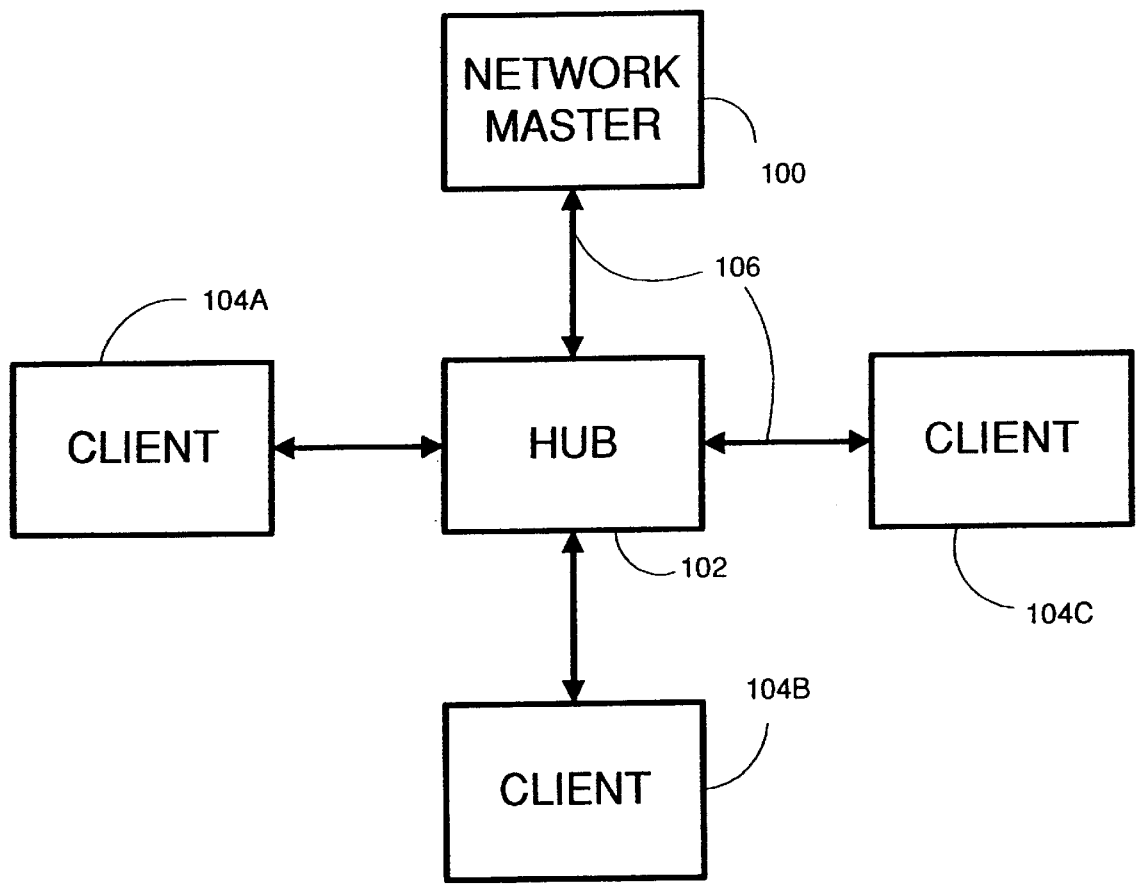
FIG. 1 is a block diagram of a network arrangement suitable for implementation of the invention.

Referring to FIG. 1, backbone connecting circuitry (LAN bus) 101, including a hub 102 for a local area PC network preferably conforms to specifications for Ethernet. A network manager system is connected to LAN bus 100 and exercises control over operation including allocation of bus ownership. One or more individual client personal computers (clients) 104A–C are attached to the LAN bus 100 by adapters (not shown) conforming to the specification for the LAN (e.g. the Ethernet specification).

Figure 2:
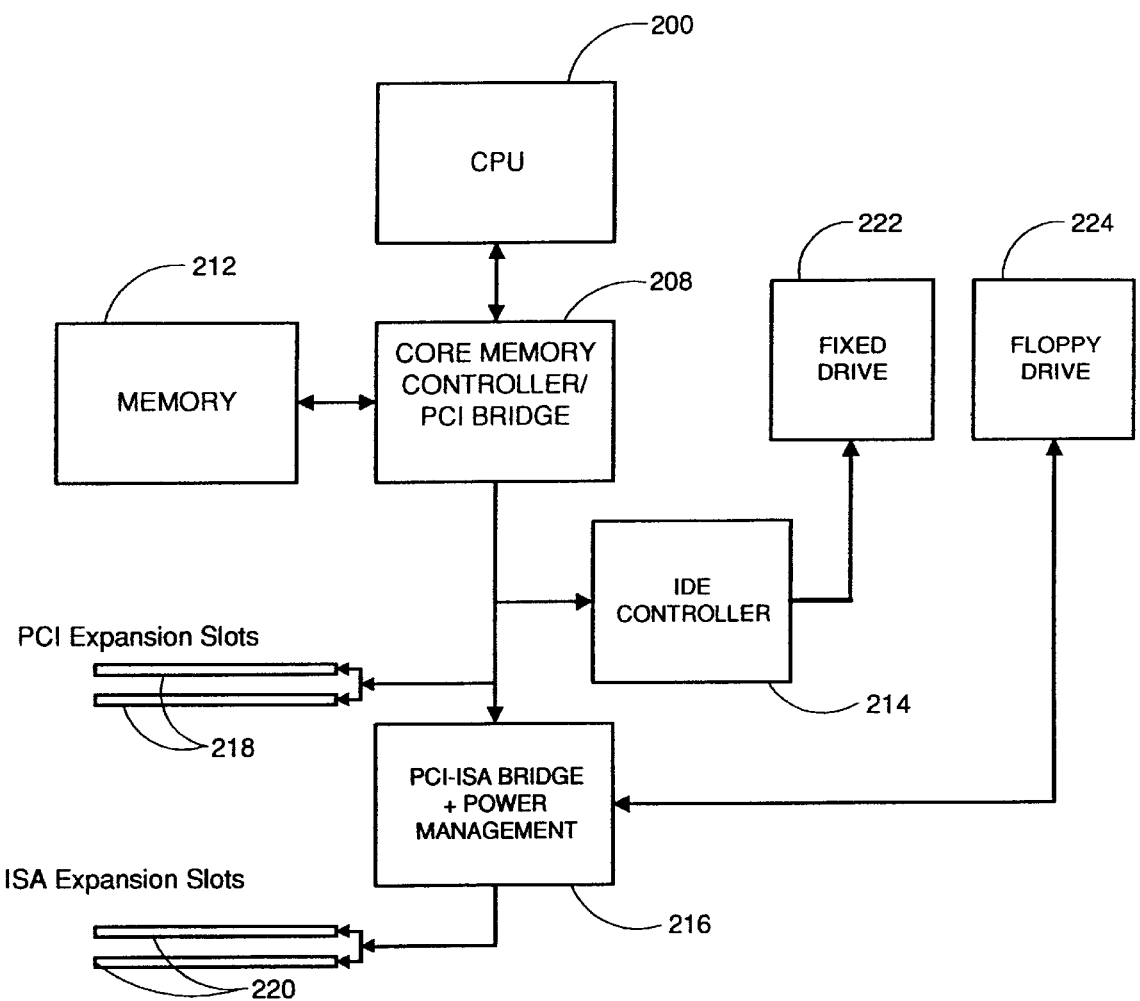
FIG. 2 is a block diagram of a client system suitable for implementation of the invention.

A computer system suitable for use as a client station 104 is indicated in FIG. 2. A central processing unit(CPU) 200 is connected by address, control and data busses 202 to a memory controller and PCI bus bridge chip 208. System memory 212 is connected to the chip 208 as are an IDE device controller 214 and a PCI bus to ISA bus bridge chip 216 which typically also includes power management logic. For an intelligent client station 104 there would normally be a fixed and a floppy drive 222 and 224 for data and program storage. A PCI standard expansion bus with connector slots 218 is coupled to the chip 208 and and ISA standard expansion bus with connector slots 220 is connected to bridge chip 216. It will be appreciated that other expansion bus types may be used to permit expansion of the system with added devices and it is not necessary to have two expansion busses.

Figure 3:
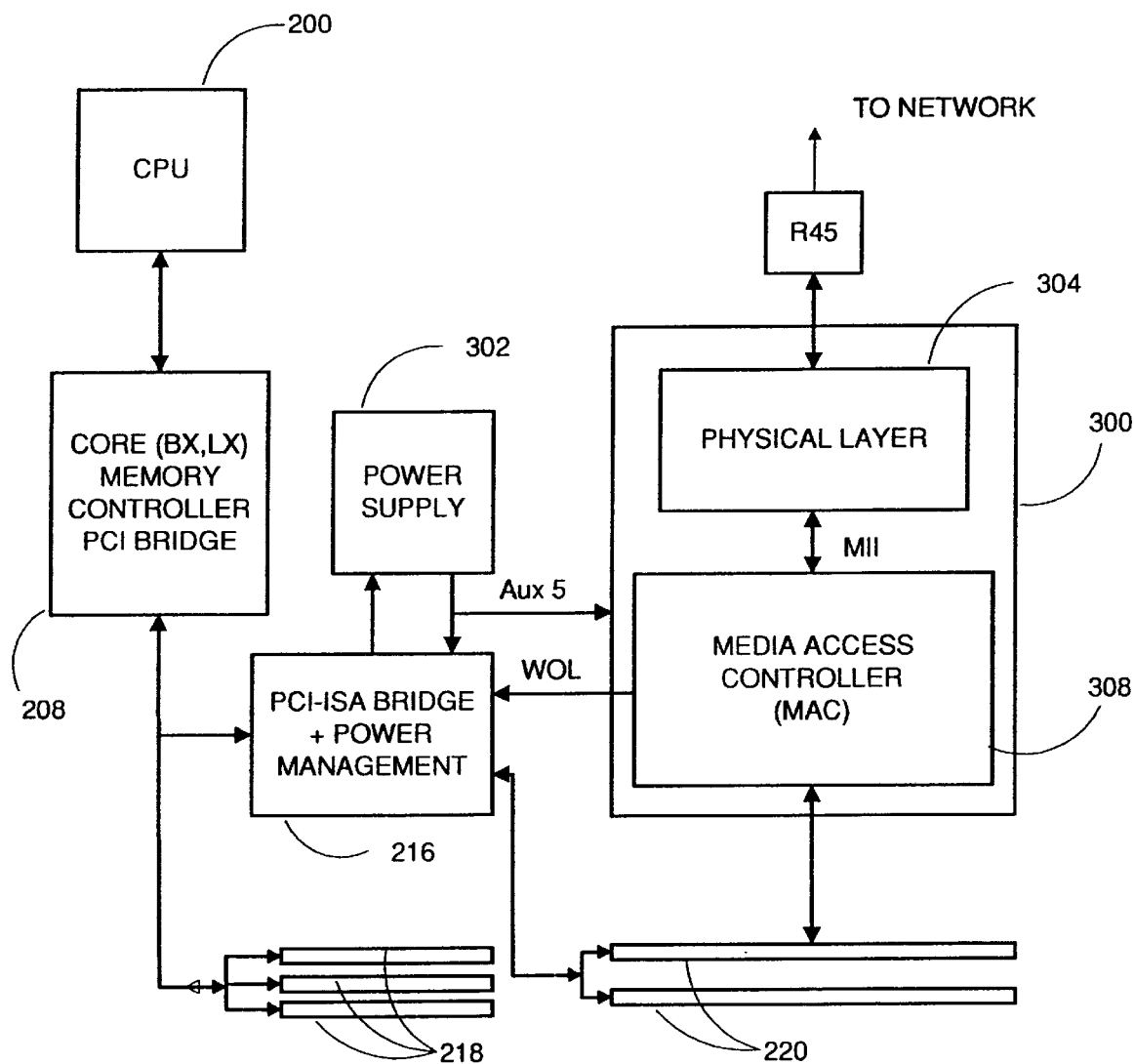
FIG. 3 is a block diagram of a system client with normal network connection circuitry.

Now, referring to FIG. 3, a client system 104, has a network adapter 300, which may, for example be plugged into one of connector slots 220. The client system 104 is shown with a special power supply 302 which responds to a signal WU to switch on and supply full normal system power and has a auxiliary power main Aux 5 which supplies full time power to the power management chip 216 and the network adapter 300. This enables the system, as is known, to respond to a wakeup signal and power up the system. The network adapter 300 is shown as two elements the physical layer 304 which conditions analog signals to go out to the network, for example an ethernet network over an R45 connector 306 as is well known. A media access controller (or MAC) 308 processes the network signals in digital form and comnnects to the bus 220. If the incoming signal conforms to Magic Packet form it is a wakeup command and the MAC 308 issues a WOL signal to cause the power supply to energize the client system 104. The adapter 300, it should be appreciated, may be added as an adapter card (as shown) or implemented directly on the system motherboard. To support wake up operation it is powered off the full time auxiliary line Aux 5.

Figure 4:
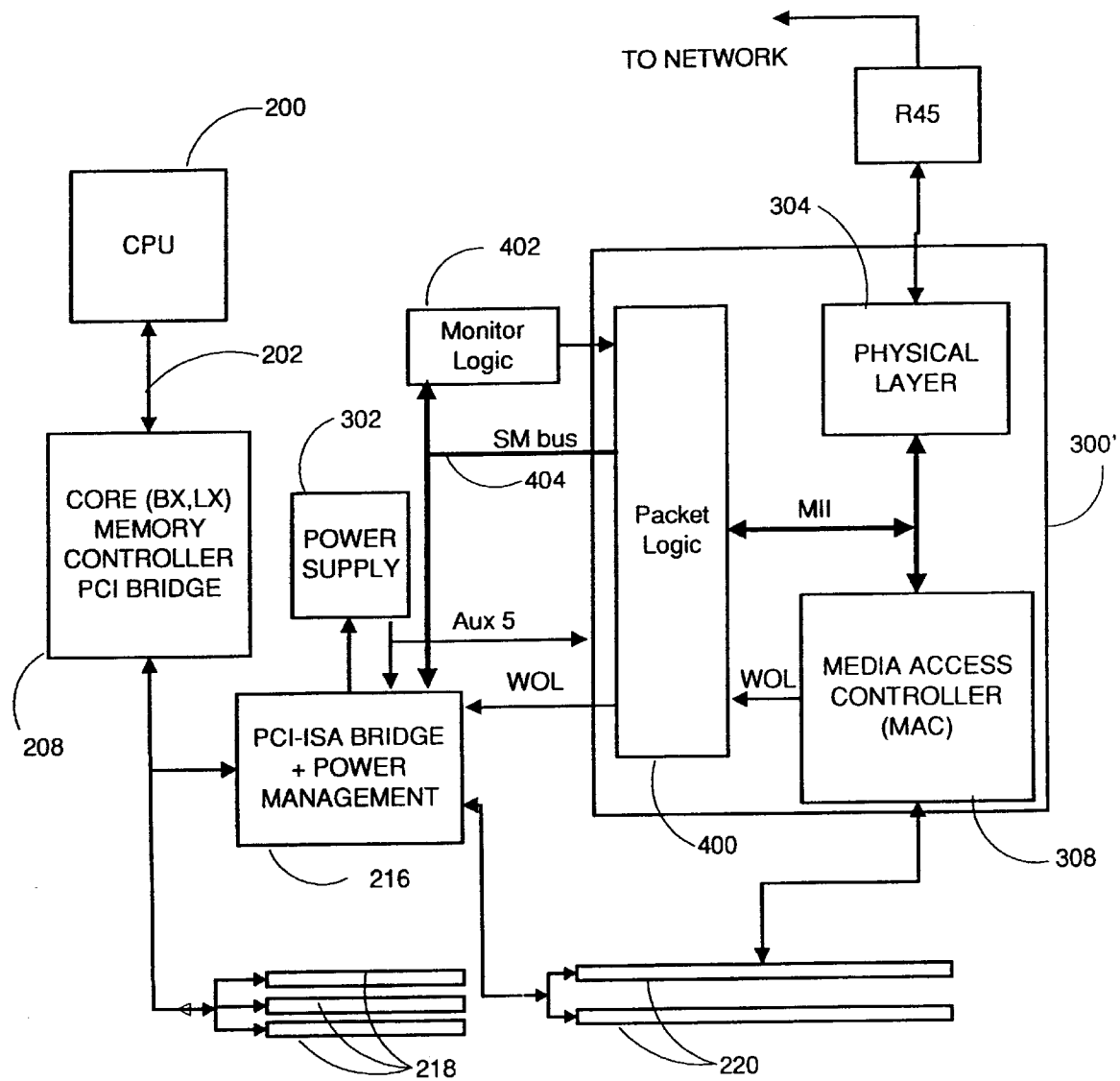
FIG. 4 is a block diagram of a client system with full time logic according to the invention introduced into the network adapter.

The client system 104 of FIG. 4 has a specially modified network adapter 300' with a packet logic module 400 connected at the MII bus that extends between the physical layer 304 and the MAC 308. This logic may be a "hard wired" ASIC or a programmed general purpose processor programmed as described below. By so connecting the logic 400 at the MII bus, it can send and receive network packets using the physical layer 304. The logic 400 according to the invention accepts data from a source such as monitor logic 402. Data from the client system 104 is accessed by the logic 400 over the system management bus (SM bus) 404. With the trickle power supplied on bus Aux 5 of power supply 302 the packet logic 400 is preferably powered full time.

Figure 5:
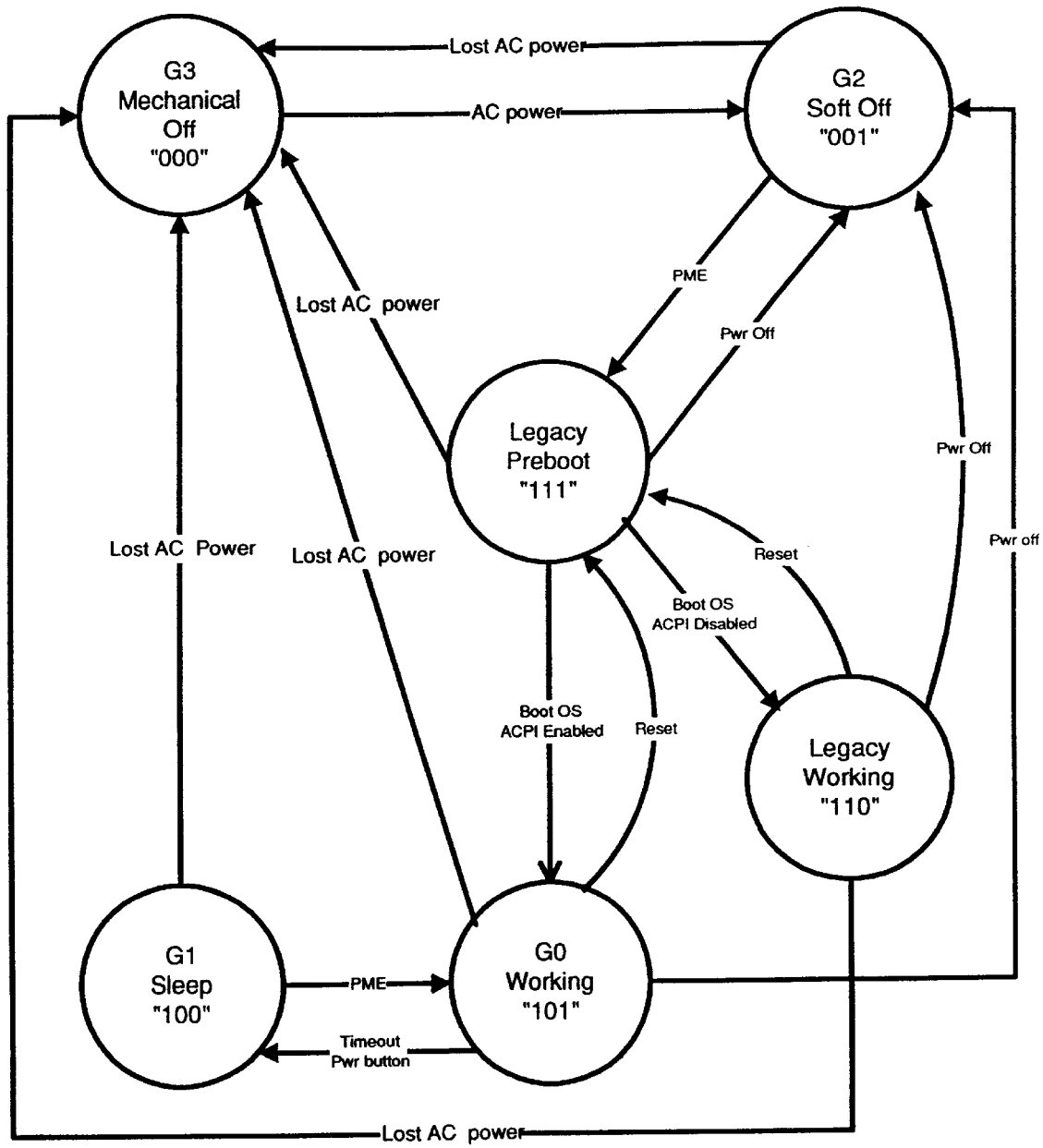
FIG. 5 is a state diagram indicating power states for the client system and transition events that cause a transfer from one state to another.

At FIG. 5, power states are identified by the circles and the states G0, G1, G2 and G3 represent the four states specified by the ACPI specification with which most current personal computers comply. The legacy states are additional states that may be of interest to the network manager. The arrows extending between the state circles identify the events that result in a state transition and are generally self explanatory. The transition labeled PME is a set of events such a mouse movement or wake up on LAN that trigger a transition (see FIG. 6 PME signal from logical ORed event interrupts).

Figure 6:
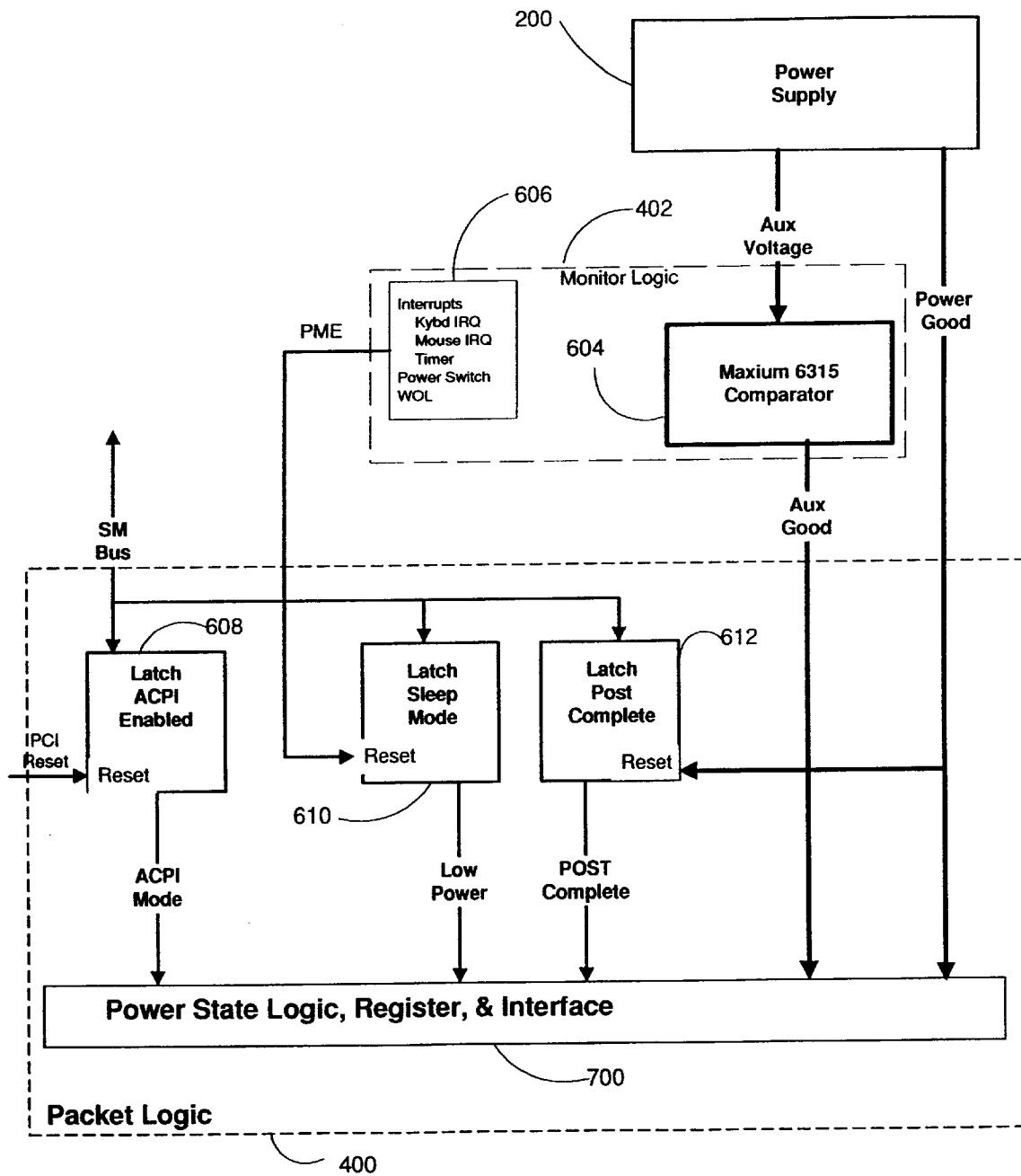
FIG. 6 is a detailed block diagram of monitor logic for detecting and tracking state transfer events.

Referring to FIG. 6, monitor logic 402 for detecting and tracking state transfer events is shown including voltage a comparator 604 and interrupt detector 606 for events such as keyboard interrupts. Packet logic 400 receives the monitor logic signals PME, Power Good and Aux Good the state of which is retained at the register and interface 700.

Figure 7:
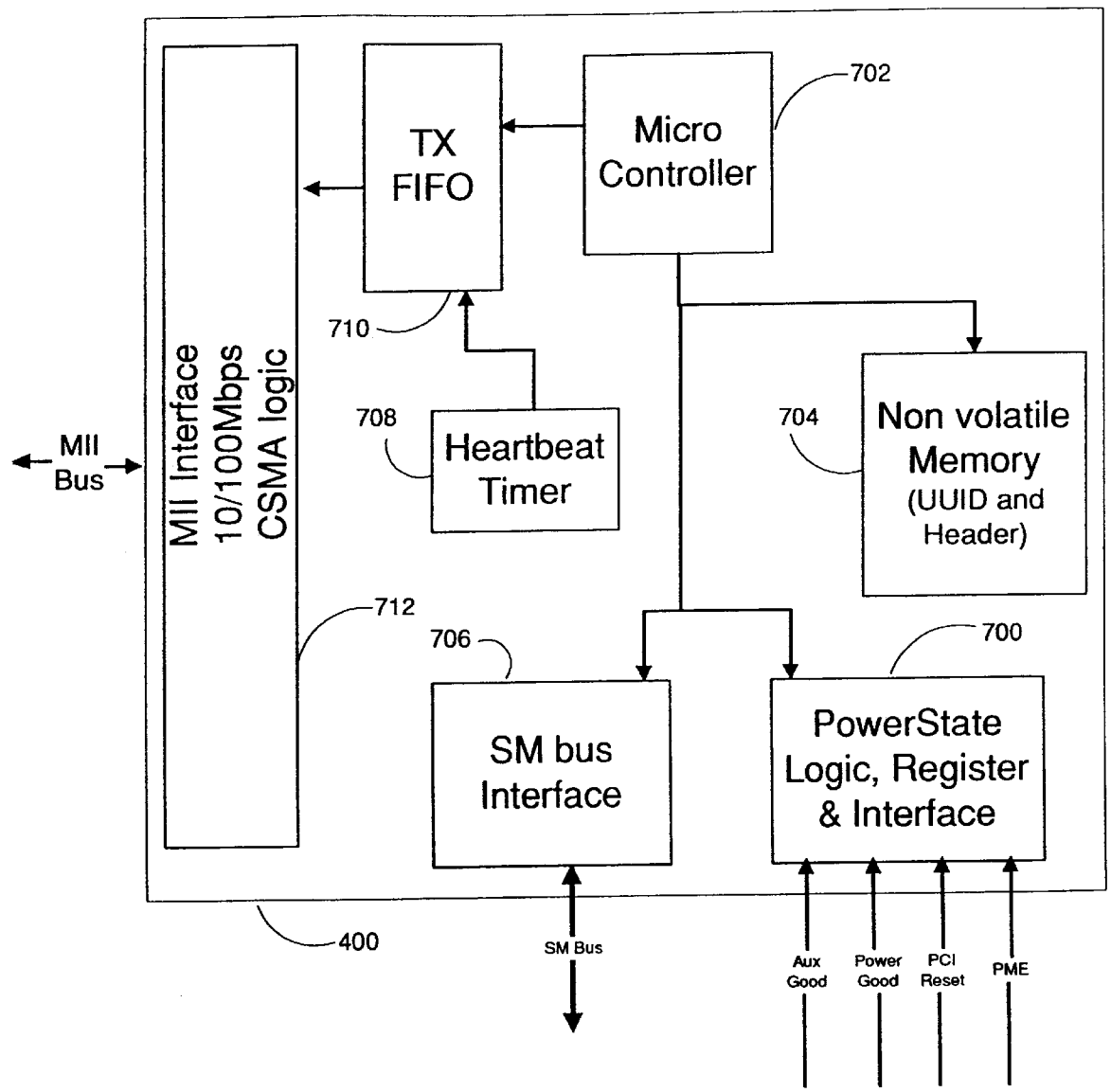
FIG. 7 is a block diagram indicating the components of the auxiliary logic for transmitting power state information according to the invention.

Referring to FIG. 7, the packet logic 400 is preferably an ASIC with a power state logic and interface register for receiving the signals from the monitor logic 402. The microcontroller 702 produces a packet (see description at FIG. 9) using fixed universal ID and header information and the power state data from power state logic and interface register 700 and Smbus interface. The microcontroller 702 sends the packets to a FIFO register 710 which preferrably sends out a status packet periodically in response to a periodic trigering signal from timer 708. The packet is applied to the MII bus by the MII interface 712 (see also FIG. 4).

Figure 8:
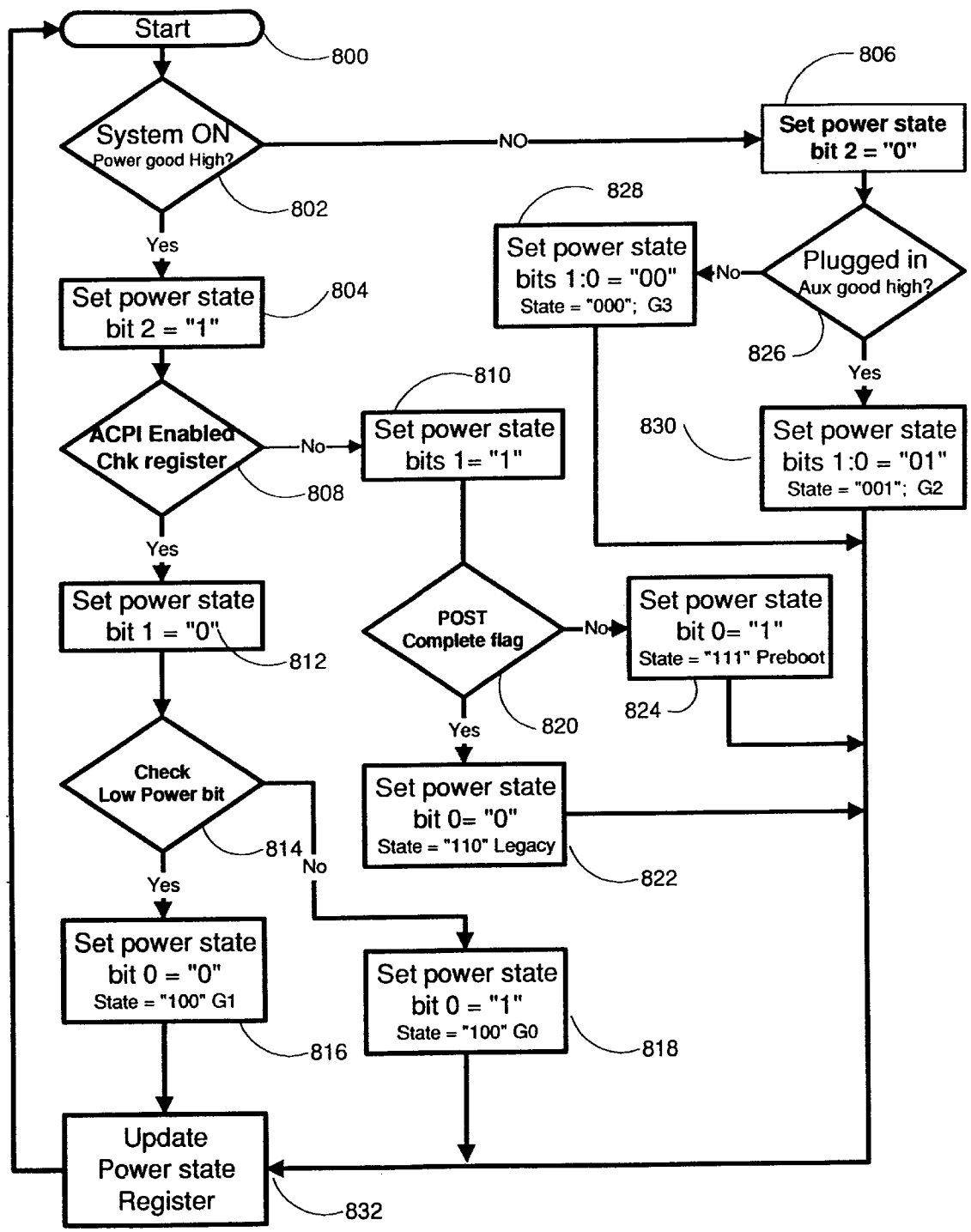
FIG. 8 is a flow chart description of the monitor logic to track the power states according to hte invention.

The process of monitor logic 402 is described for implementation by FIG. 8. Starting at 800 the power good signals is tested (802) and bit 2 is set accordingly (804, 806). A test of ACPI enable triggers setting of bit at 810 or 812 accordingly. A check of the low power bit sets bit 0 accordingly. If ACPI was not enabled POST complete is tested (820) to set bit 0 (822, 824). If the main power is of at 802, the auxiliaty power is checked (826 and bits 1:0 are set (828, 830). At the endo fo the process the power state register 700 is set (832).

Figure 9:
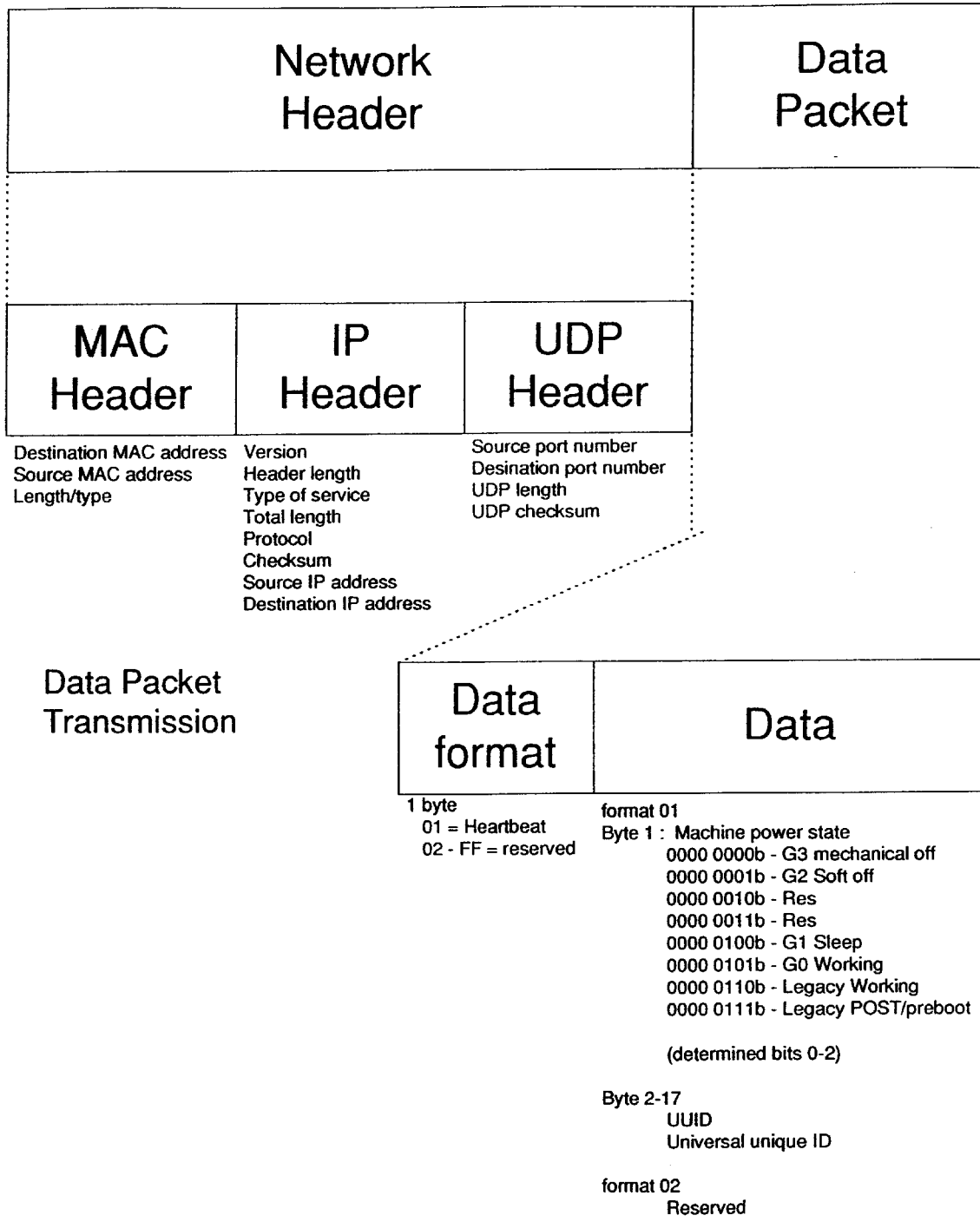
FIG. 9 is a diagram indicating the formatting of a packet for sending power data over a network according to a preferred implementation for the invention.
Figure 10:
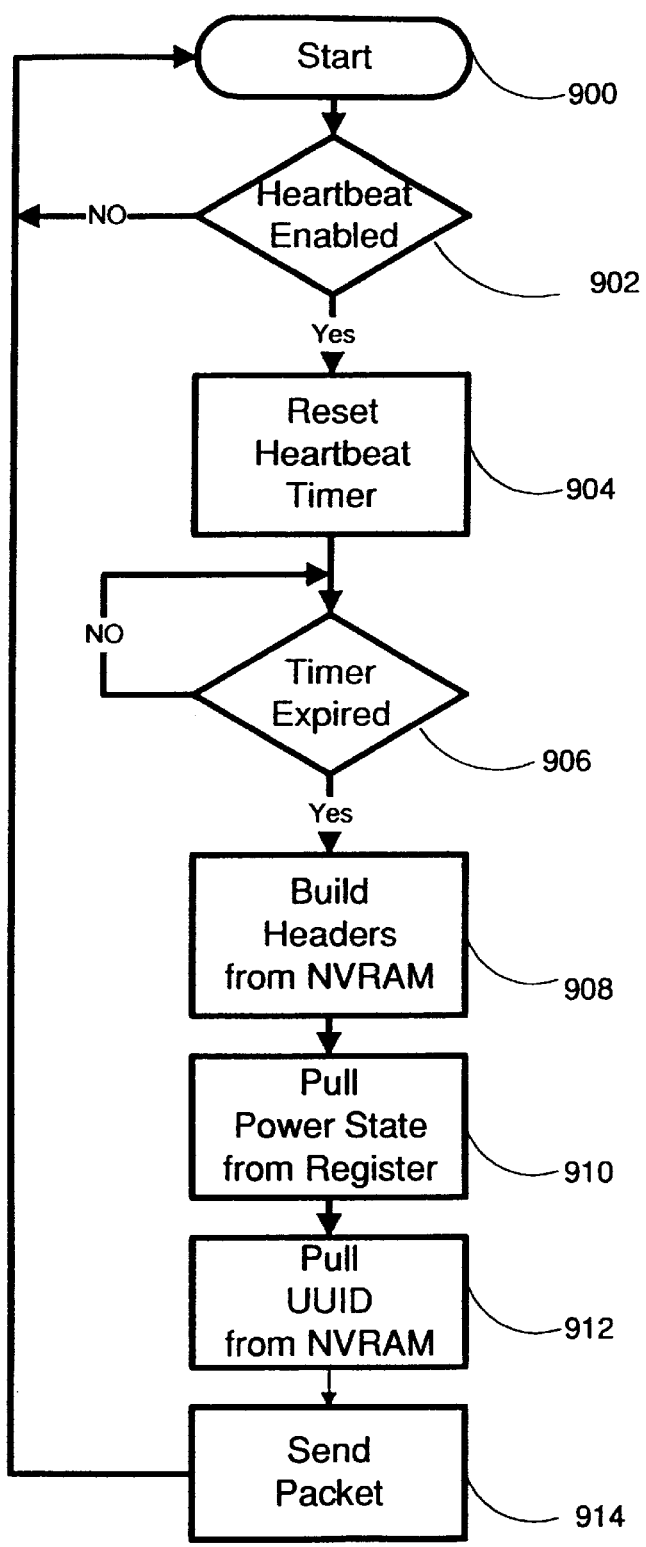
FIG. 10 is a flow chart indicating the process logic for creating the data packets according to the invention.

Referring to FIG. 9 the header and data formats with the bit placements are indicated. FIG. 10 describes the implementation of the process of the packet logic 400. After start (900) the heartbeat is tested (902) and if on it is reset (906). If the timer is expired the packet logic 400 builds the packet (910, 912, 914) and sends it to the MII bus(916).

Figure 11:
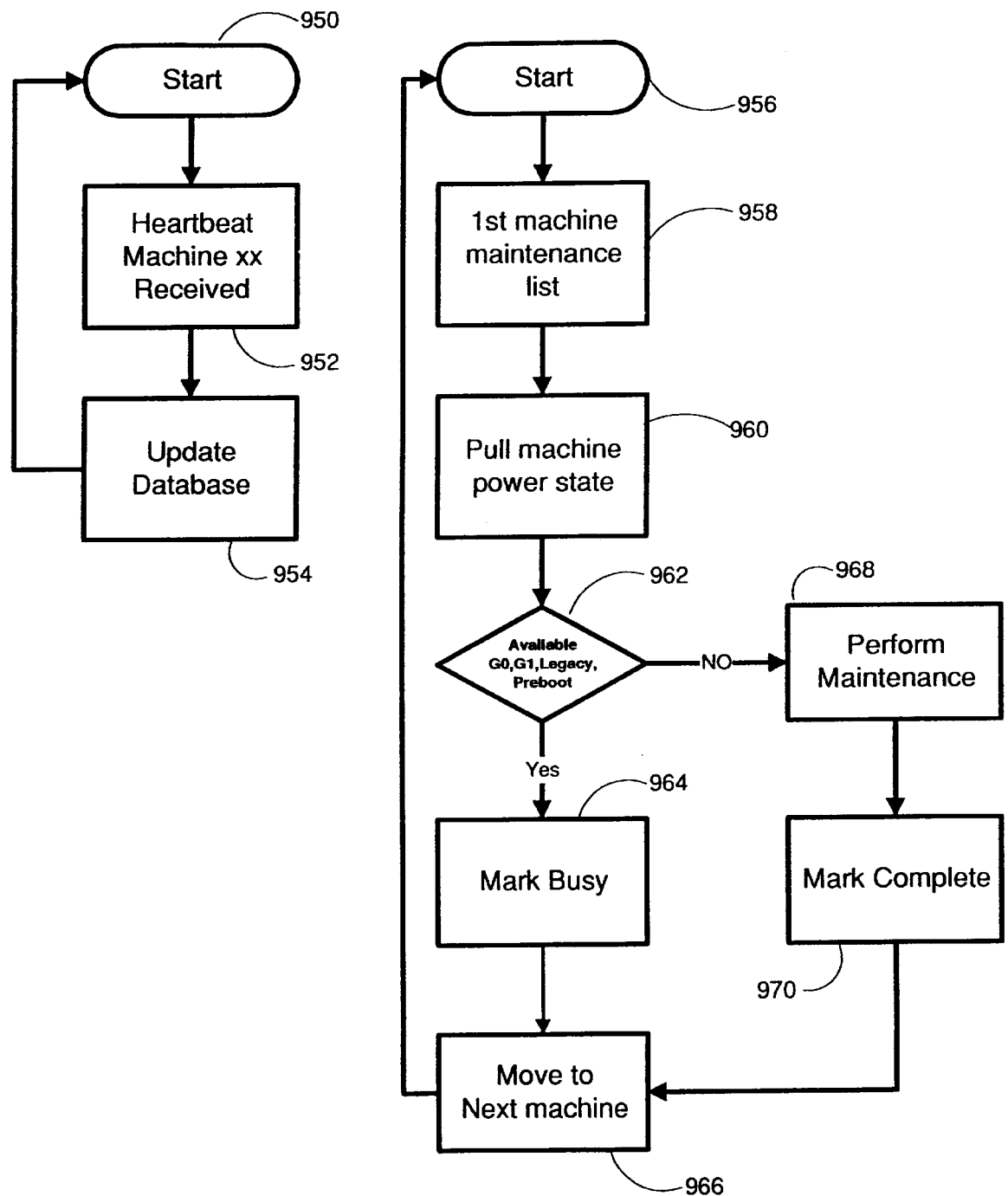
FIG. 11 is a flow chart indicating processing of the packets at the network master.

FIG. 11 describes the process at the network manager for processing the packets. The packet is received (952) and associated with a machine and the data recorded in the database(954). The sequence for selecting machines for maintenance is indicated in steps (956–970). Step 962 tests for the states G0, G1 Legacy and Preboot that normally allow maintenance to be performed without undesirable consequences.

The invention has been described with reference to preferred implementations thereof but it will be appreciated that variations and modifications within the scope of the claimed invention will be suggested to those skilled in the art. For example, the invention may be implemented on networks other than Ethernet networks such as token ring networks.

What is claimed is:

1. A client computer system coupled to a server computer system via a personal computer network, said client computer system including a network adaptor with a transfer portion connected to the network that conditions signal packets in a predefined digital format received from a client side portion thereof to a form to be transmitted over such a network and has a plurality of power states including a fully operational state, an off state and at least one partially powered state in which the client computer system is not fully operational, said client computer system comprising:

auxiliary logic which monitors client computer system events in all of said plurality of power states to identify a current one of said plurality of power states of the client computer system, said auxiliary logic monitoring system events which occur within said client system;

transfer logic, cooperating with said auxiliary logic, connected to said transfer portion at the client side thereof, which stores the identity of the current power state, creates packets specifying said current power state according to the predefined digital format and applies them to said transfer portion for transmission at predetermined intervals irrespective of said current power state of said client computer system; and a power source which applies continuing power to said auxiliary logic and transfer logic irrespective of the power state of said client computer system.

2. A client computer system according to claim 1 wherein said predetermined intervals are periodic.

3. A client computer system according to claim 1 wherein said power source is an auxiliary power portion of a general power supply for said client computer system.

4. A client computer system according to claim 1 wherein said personal computer network conforms to the Ethernet Specification and the signals on said network are digitally encoded analog signals.

5. The client computer system according to claim 1, wherein said client computer system further comprises:

said network adapter including a physical layer, a processor, and a media access controller (MAC), said network adapter being constantly powered by a trickle power from said power source; and said processor including said auxiliary logic and said transfer logic.

6. The client computer system according to claim 5, further comprising monitor logic coupled to said processor for monitoring said client computer system events.

7. The client computer system according to claim 1, wherein said power states further comprises a mechanical switch off state, a sleep state, a working state, and a soft power off state.

8. The client computer system according to claim 7, further comprises:

said auxiliary logic capable of detecting a transition of the client computer system from said sleep state to said mechanical off state;

said transfer logic capable of storing an identification of said power off state and creating a packet specifying said power off state while the client computer system is in said power off state; and said transfer portion capable of transmitting said packet while the client computer system is in said power off state to a server computer system which is coupled to the client system.

* * * * *